United States Patent [19]
Nagai

[11] Patent Number: 6,138,072
[45] Date of Patent: Oct. 24, 2000

[54] NAVIGATION DEVICE

[75] Inventor: Takaaki Nagai, Wako, Japan

[73] Assignee: Honda Giken Kogyo Kabushiki Kaisha, Tokyo, Japan

[21] Appl. No.: 09/064,683

[22] Filed: Apr. 22, 1998

[30] Foreign Application Priority Data

Apr. 24, 1997 [JP] Japan .................................. 9-142890
Apr. 24, 1997 [JP] Japan .................................. 9-142891

[51] Int. Cl.⁷ .......................... G01C 21/00; G08G 1/123; H04M 1/64
[52] U.S. Cl. .......................... 701/207; 701/200; 340/988; 340/995; 345/145; 345/326; 345/357; 379/88.17; 379/900
[58] Field of Search ....................................... 701/200, 207, 701/201, 213; 340/990, 995, 988; 345/326, 357, 145; 379/88.17, 900

[56] References Cited

U.S. PATENT DOCUMENTS 5,610,821  3/1997  Grazis et al. .......................... 701/225
5,724,316  3/1998  Brunts .................................... 701/201

*Primary Examiner*—William A. Cuchlinski, Jr.
*Assistant Examiner*—Yonel Beaulieu
*Attorney, Agent, or Firm*—Lyon & Lyon LLP

[57] ABSTRACT

A navigation device provided with an Internet communication means, a browser means for connecting to a specified home page according to a uniform resource locator (URL) and a memory for storing a data table of URLs of home pages established for respective objects existing in the area of a map displayed by the navigation device, which device reads a URL of a specified home-page from the memory and presents a content of the home page obtained by using the URL when the user directly designates the object or the position on a map shown on the display screen.

8 Claims, 6 Drawing Sheets

FIG.6

| Map No. | Object Name | URL |
|---|---|---|
| 1 | restaurant #5<br>restaurant #2<br>⋮<br>shop #5<br>shop #17<br>⋮<br>shop #101 | http://www.~<br>http://www.~<br>⋮<br>http://www.~<br>http://www.~<br>⋮<br>http://www.~ |
| 2 | company #1010<br>⋮ | http://www.~<br>⋮ |

FIG.7

| | Long. 139°37' | | Long. 139°38' | |
|---|---|---|---|---|
| Lat. 35°46' | restaurant #5<br>company #120<br>shop #1200<br>- - - | http://www.~<br>http://www.~<br>http://www.~<br>- - - | shop #1231<br>- - - | http://www.~<br>- - - |
| Lat. 35°47' | shop #1125<br>- - - | http://www.~<br>- - - | office #156<br>- - - | http://www.~<br>- - - |

6,138,072

NAVIGATION DEVICE

BACKGROUND OF THE INVENTION

The present invention relates to a navigation device for use in a vehicle, which device is capable of determining and displaying a current position of the vehicle on a road map indicated on a display screen.

There has been developed such a conventional navigation device which can provide drivers with various kinds of guiding information, e.g., information on tourist spots, restaurants and parking lots, which exist in and around a road-map area in which vehicle is traveling.

The conventional device previously stores in its memory guide information on tourist spots, restaurants, parking lots and other places and, by user's selection from menus (e.g., a list of tourist spots), reads out the requested information from the memory and presents that information on the display screen.

However, the above-mentioned conventional device involves a problem that it requires a large capacity of the memory for previously writing therein guide information on respective locations and objects, e.g., tourist spots, restaurants, parking lots and so on, which exist on a map, and requires complicated operations for searching and reading-out the requested information therefrom.

Furthermore, the content of the memory may not easily be updated with fresh guiding information and new object information.

SUMMARY OF THE INVENTION

Accordingly, a primary object of the present invention is to provide a navigation device which is provided with an Internet communication means, a browser means for connecting to specified home pages established on sites of the Internet world-wide web according to a URL (Uniform resource locator) and a memory means for storing a data table containing registered URLs of the home pages for providing information on objects existing on the road map displayed by the device, and which device operates by obtaining data of a specified object from digital map data according to the object designated by the user on the map indicated on the display screen, reading a URL of a home page corresponding to the object data from the memory means, obtaining a content of the home page by the browser means according to the read URL and displaying the obtained guide information on the object on the display screen.

Another object of the present invention is to provide a navigation device that includes an Internet communication means, a browser means for providing the connection to specified home pages established on sites of the Internet's world-wide web according to URLs (Uniform resource locators) and a memory means for storing a data table of registered URLs of home pages with reference to corresponding positions indicated on the map, and which operates by recognizing a position designated by the user on a map indicated on a display screen, reading from a URL of a home page corresponding to the designated position, obtaining a content of the home page by the browser means and displaying the obtained information on the display screen.

The navigation device according to the present invention is compact and easy to operate and can easily obtain guide information on any desired object, eliminating the need for a large-capacity memory. The device can always obtain fresh guide information from specified home pages established for providing guide information on respective objects and can expand a scope of available information by merely writing URLs of new home pages to the data table of registered homepage URLs.

BRIEF DESCRIPTION OF THE DRAWINGS

FIG. 6 shows an exemplified content of a data table of URLs of home pages corresponding to respective locations existing on a map.

FIG. 7 shows an exemplified content of a data table of a URL of home pages corresponding to respective positions existing on a map.

DESCRIPTION OF THE PREFERRED EMBODIMENTS

The preferred embodiments of the present invention will be described in detail by way of example and with reference to the accompanying drawings.

Figure 1:
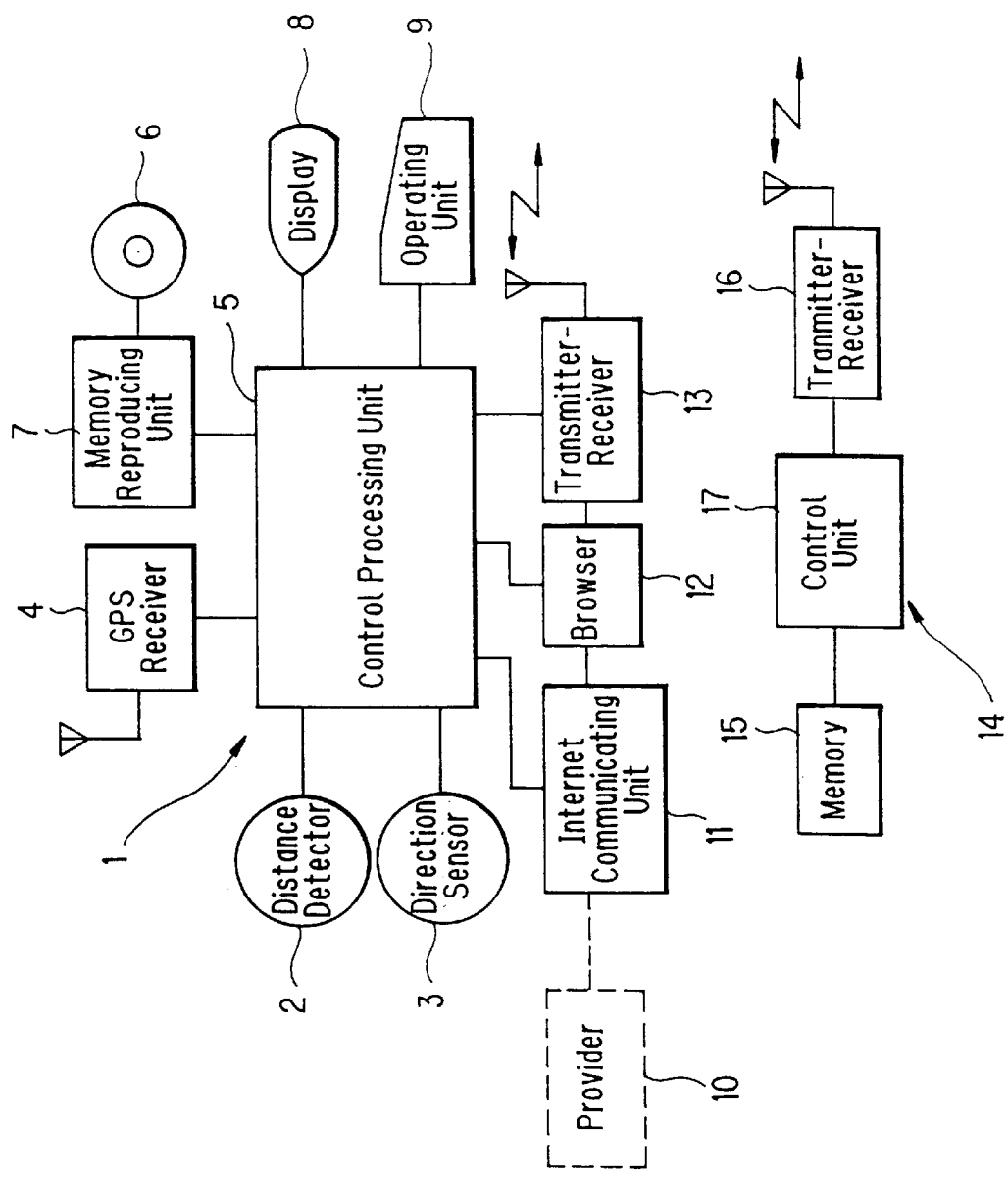
FIG. 1 is a construction block-diagram of a navigation device embodying the present invention.

As shown in FIG. 1, a navigation device 1 according to the present invention comprises: a distance detector 2 for detecting a distance traveled by a vehicle in which the navigation device is mounted; a direction sensor 3 for detecting the running direction of the vehicle; a global positioning system (GPS) receiver 4 for determining a current position of the vehicle; a control processing unit 5 for determining the current position of the vehicle on a road map by calculating values of its coordinates on a X-Y-coordinate system based on a traveled distance detected by the distance detector 2 and a running direction detected by the direction sensor 3 in combination with measurements of the current position of the vehicle on the road map on the basis of GPS information received by the GPS receiver 4 and, at the same time, performing control of the whole system of the device and necessary processing operations; a road-map memory medium 6 for storing digital road-map information, a memory reproducing device 7 for selectively reading necessary area information of the road map from the road-map memory medium 6; a display unit 8 for presenting the selected area road map on a display screen according to the read road-map information and, at the same time, indicating the current position of the vehicle on the road map, and updating it with movement of the vehicle; and an operating unit 9 for instructing the control processing unit 5 to input control signals such as signals for selecting a map to be displayed on the display screen, changing the scale of presentation of the map, selecting an item from a menu, positioning a cursor on the display screen and so on.

The navigation device 1 according to the present invention is featured in particular by the fact that it is provided with an Internet communication device 11 for communicating with an existing provider 10 in the Internet over a telephone communication line, a browser 12 for connecting to specified home pages by using corresponding registered URLs (uniform resource locators) through the Internet communication device 11 and a transmitter-receiver 13 for communication with a base station 14, all of which operate under the control of the control processing unit 5.

The base station 14 is constructed of a memory 15 storing a previously registered data-table containing URLs of home pages corresponding to respective locations and objects existing on the map, a transmitter-receiver 16 for communication with the navigation device and a control unit 17 for controlling the access to the memory 15 and data communication with the navigation device 1.

The operation of the above-described navigation device is as follows:

FIG. 6 depicts an exemplified content of the data table registered in the memory 15.

Figure 2:
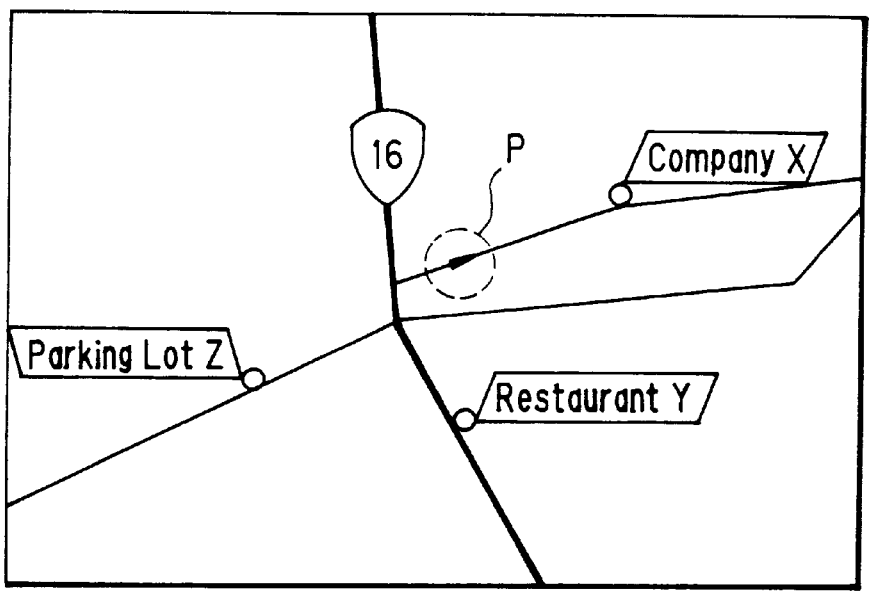
FIG. 2 is illustrative of an exemplified image shown on a display screen by a navigation device according to the present invention while the device works in a current position displaying mode.

FIG. 2 is illustrative of a map image presented on the display screen 8 while the navigation device works in the current-position indicating mode. On the map displayed on the display screen, there is also shown a mark P indicating the current position of the vehicle in addition to respective objects such as a company X, a restaurant Y, a parking lot Z and the 16th national road.

Figure 3:
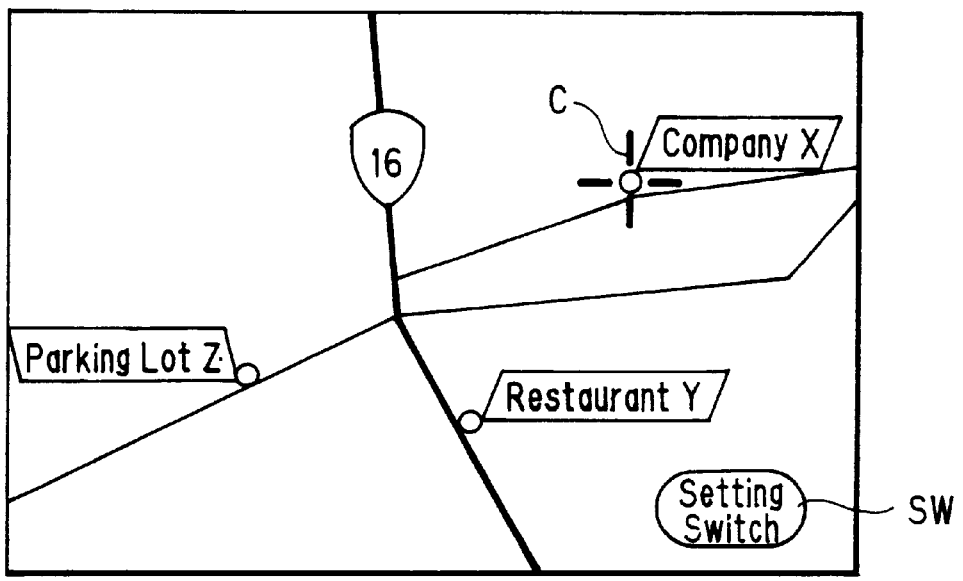
FIG. 3 is illustrative of an exemplified image shown on a display screen by a navigation device according to the present invention when a user selects an item from a home-page menu on the image.

When the user selects a home page menu by using the operating unit 9, the image of FIG. 2 is changed under the control of the control processing unit 5 to a new image shown in FIG. 3, in which a cursor C appears and a setting switch SW for positioning the cursor is indicated at a corner of the screen.

When the user locates cursor C on a desired object (e.g., company X) on the road map and then presses the setting switch SW, the control processing unit reads data of the object (company X) and causes the transmitter-receiver 13 to transmit to the base station 14 the object data together with the number of the map on which the object is shown.

The object data comprises data of each of respective objects (e.g., company X, restaurant Y, parking lot Z and national road No. 16 and so on) which are stored in the digital map memory and necessarily used for displaying the object on the display screen.

At the base station 14, the control unit 17 receives the object data through the transmitter-receiver 16, reads the memory 15 to obtain data of a URL corresponding to the object data referring to the map number and transmits the URL data to the navigation device through the transmitter-receiver 16.

At the navigation device 1, the control processing device 5 displays the received data of the URL for the desired home page together with an access switch for connection with the home page on the display screen. The access switch is operated by the user to start an application program of the browser 12.

The designated home page is thus caught through the Internet communication device 11 and the content of the home page concerning the object (e.g., company X) is presented on the display screen.

If no URL data of the home page corresponding to the object data from the navigation device 1 is found in the memory 15, the base station 14 informs the navigation device 1 that the required URL has not been registered and, therefore, the navigation device 1 indicates this information on the display screen.

Figure 4:
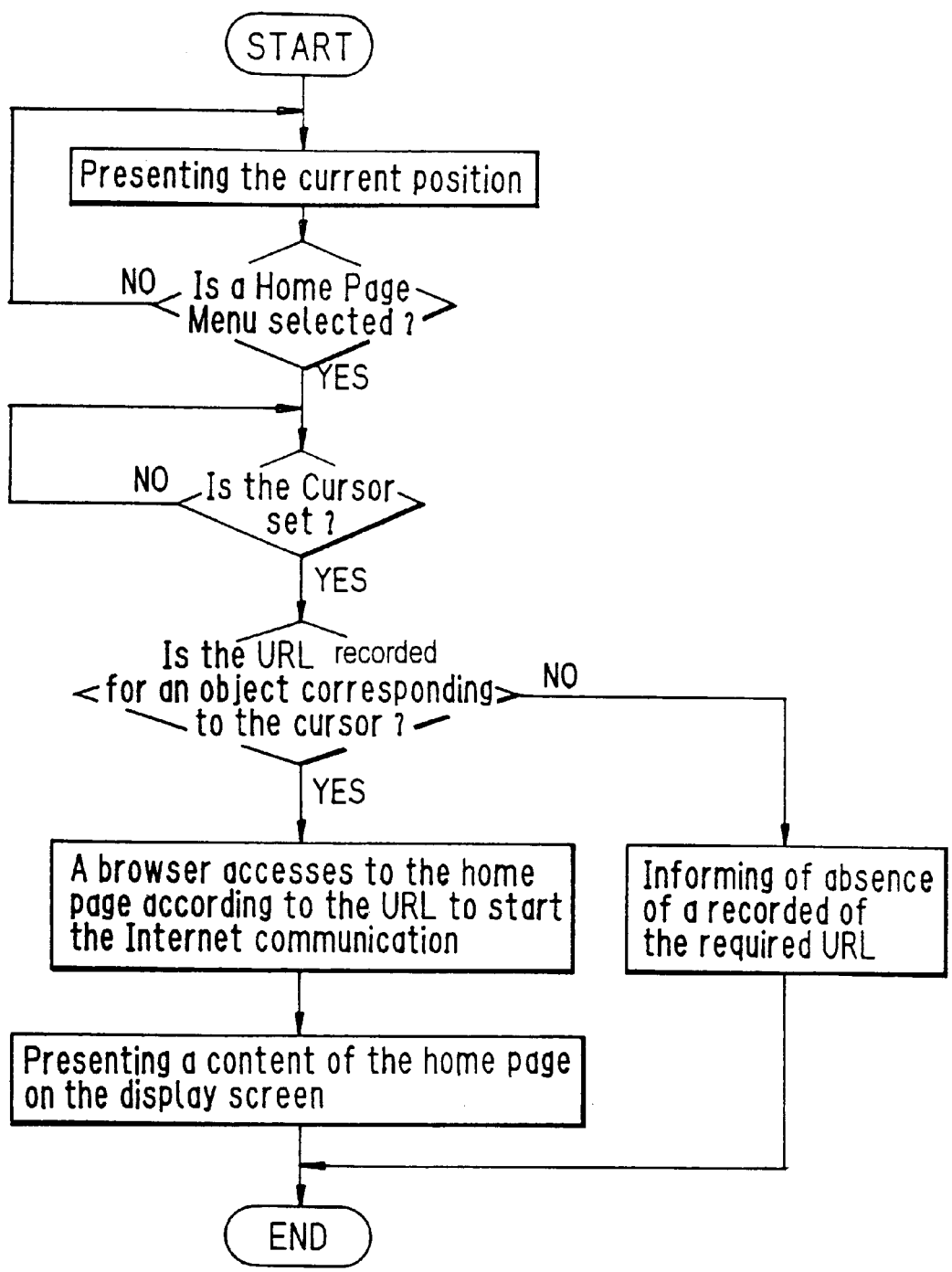
FIG. 4 is a flowchart describing a procedure for obtaining a home page for providing information on an object indicated on a map by a navigation device according to an aspect of the present invention.

FIG. 4 is a flowchart depicting the procedure of operations to be executed by the control processing unit 5 as described above.

The above-mentioned system proposed by the present invention enables the user by a simple operation to easily obtain guide information on any one of the objects existing on a map shown on the display screen by accessing specifed home pages established in the Internet. In the shown example, it is possible for the user to read information on the company, parking lot or traffic information on the 16th national road on the display screen.

It is also possible to always obtain fresh (timely updated) information on objects shown on the map from respective home pages provided for the objects. The scope of available guide information on objects can also be expanded by simply writing URLs of new home pages into the memory 15 of the base station.

The above-described system can be modified for example as follows:

The memory 15 of the base station 14 has memory spaces corresponding to areas' numbers of the road map and stores in each space records of home-page URLs corresponding to respective objects existing in the same area-map number. When the navigation device 1 informs the base station of only the current area-map number shown on the display screen, the base station 14 reads all URLs of home pages corresponding to the objects shown on the current area-map from the corresponding space of the memory 15 and transmits all the read-out URLs to the navigation device 1. This method is effective in particular when a map shown on the display screen concerns a relatively small area with the limited number of home pages established in the area.

The area-map numbers are contained in the digital map data to be displayed on the display screen. The control processing unit 5 reads the digital map data to find the current map number shown on the display screen.

The base station 14 can be commonly used by a plurality of vehicles that are each provided with the navigation device according to the present invention. The base station may be installed at multiple places, one in each of respective areas so that each vehicle with the navigation device can communicate with a base station existing in a specified area where the vehicle is traveling. It is also possible for the vehicle to communicate with one of several base stations that provide different specific home-page URLs.

The navigation device according to the present invention may also have a memory in which a data-table containing records of URLs of home pages corresponding to objects to be shown on a map. The device can obtain by itself any required home-page URL when the user designates an object existing on the current map shown on the display screen.

The present invention is not restricted to the above-described examples of navigation devices and may also use a base station having a home page written in HTML (Hypertext markup language), which home page may be directly accessed by the navigation device via the Internet.

When the user designates, for example, a restaurant A as an inquired object on a map shown on the display screen, the navigator transmits a signal written in terms of:

http://www.honda.service.cp.jp/cgi-bin/kensak.obj=/A__restrant__11/.

In the text, www.honda.service.cp.jp represents an address of IP (Internet Protocol).

The portion /A_restrant_11/ is transferred to a retrieving program "kensak" by which a URL of a home page corresponding to the restaurant "/A_restrant_11/" is searched. The URL of the home page corresponding to "/A_restrant_11/" is transmitted to the navigation device if such was found in the base station.

In the system of FIG. 1, another aspect of the present invention may work as follows:

At the base station, there is provided the memory 15 storing a data table of URLs of home pages corresponding to respective positions on road maps to be displayed on the display screen at the navigation device. When the user designates a position on a current road map shown on the display screen, the navigation device receives the home-page URL corresponding to the designated position, which URL is read out from the memory 15 and transmitted from the base station, and presents a content of the home page on the display screen. In practice, the user moves the cursor C onto any one (e.g., the company X) of the objects on the image of FIG. 3 (in the mode of selecting a home-page menu) and presses the setting switch SW on the screen, the control processing unit 5 reads the coordinate position of the company X on the coordinate system of the map and causes the transmitter-receiver 13 to transmit the obtained coordinate data of the object position together with the map number to the base station 14.

The map numbers are contained in the digital map data to be displayed on the display screen. The control processing unit 5 reads the digital map data to find the current map number shown on the display screen.

FIG. 7 shows an exemplified content of a data table contained in the memory 15, in which URLs corresponding to respective positions on a map are recorded.

At the base station 14, the control unit 17 receives the object position data through the transmitter-receiver 16, reads the memory 15 to obtain data of the URL corresponding to the object position data referring the map number and, then, transmits the read-out URL data through the transmitter-receiver 16 to the navigation device.

In the case of the table containing a plurality of home-page URLs correlating to the object position data, all the correlating URLs are transmitted to the navigation device 1.

At the navigation device 1, the control processing device 5 displays on the display screen the received data of URL for the desired home page together with an access switch for accessing the home page. The access switch is operated by the user to start the application program of the browser 12.

The designated home page is thus retrieved through the Internet communication device 11 and the content of the home page concerning the object (e.g., the company X in this case) is presented on the display screen.

If the URL data of the home page corresponding to the object information from the navigation device 1 is not found in the memory 15, the base station 14 informs the navigation device 1 that the required URL has not been registered. The navigation device 1 indicates this information on the display screen.

Figure 5:
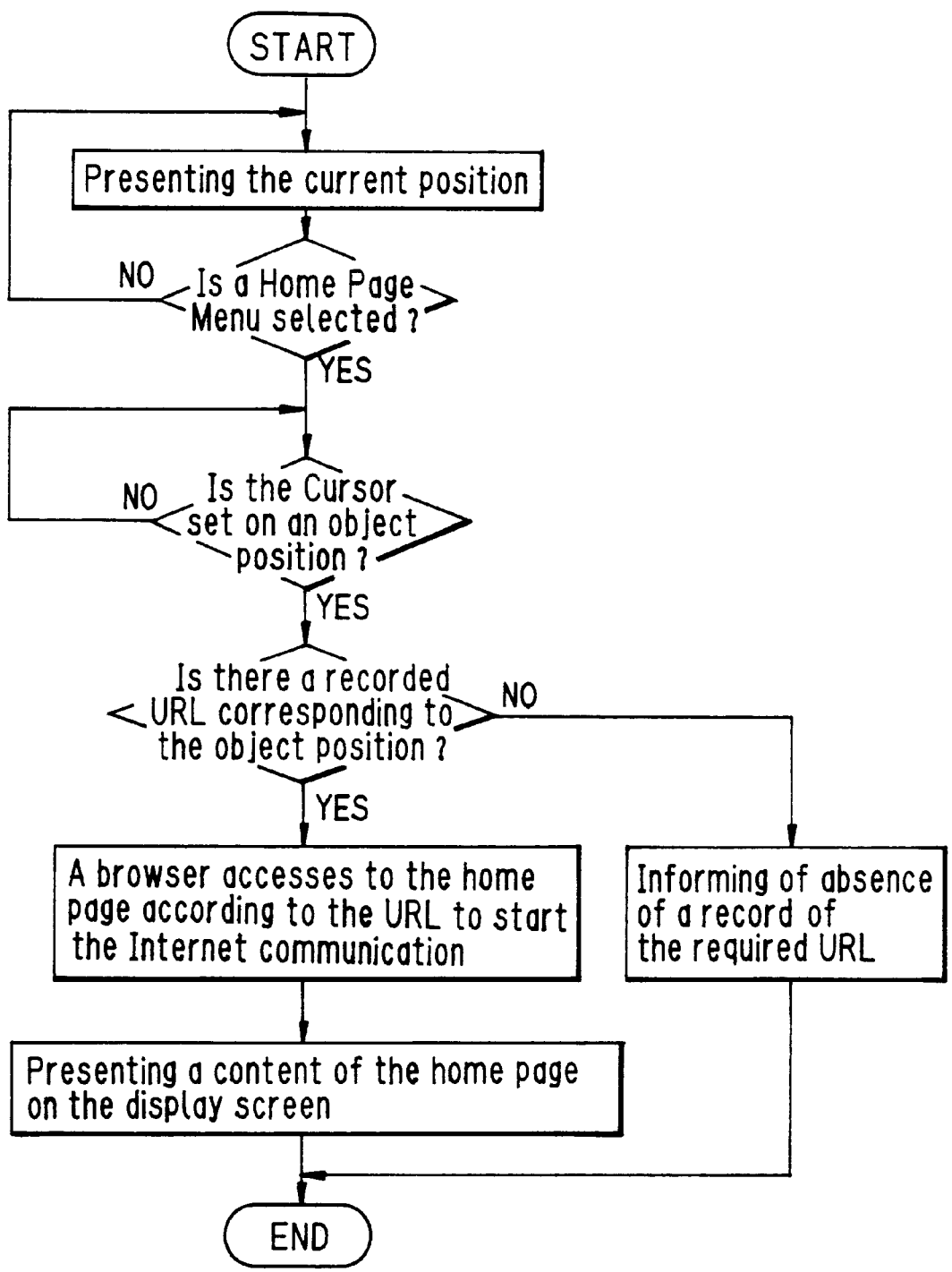
FIG. 5 is a flowchart describing a procedure for obtaining home page information according to a position selected on a map by a navigation device according to another aspect of the present invention.

FIG. 5 is a flowchart depicting the procedure of operations to be executed by the control processing unit 5 as described immediately above.

The above-mentioned system proposed by the present invention enables the user to easily obtain guide information on any one of the objects existing on the map shown on the display screen by accessing one of the available home pages. It becomes possible to obtain information on a new object that is still not shown on the navigation map when retrieving in the memory 15 on the basis of the received map-position data at the base station side.

It is also possible to always obtain updated information on objects shown on the map from respective home pages established for the objects which can be designated by their positions on the map. The scope of available guide information on objects can also be expanded by simply writing URLs of new home pages referring to the objects' positions on the map into the memory 15 of the base station.

Furthermore, the base station 14 may read the table of the memory 15 to retrieve the URLs of the home pages corresponding to the position data received from the navigation device 1 on the condition that the URLs of the related home pages existing within an area having a specified distance (e.g., 1 km) from the designated position. In this case, all the URL of the related home pages found in the area are transmitted to the navigation device.

This eliminates the possibility of failing retrieval of a corresponding home page URL in the memory due to incorrectly positioning the cursor on the object position on the map shown on the display screen. Furthermore, this may obtain a URL of a related home page established in the neighborhood of the position designated on the map.

The control processing unit 5 takes any object position designated by the cursor C as a relative position on the map shown on the display screen and may further convert the relative position to the absolute position defined in the latitude-longitude coordinate system by using a specified coefficient of coordinate transformation and transmit the obtained absolute position data to the base station. This eliminates the need for transmitting the map number.

In the base station 14, the memory 15 may contain records of URLs of home pages established for respective objects existing in respective areas which can be addressed by corresponding map numbers. In this case, the base station receives the current map number shown on the display screen from the navigation device 1, reads URLs of all home pages corresponding to the objects existing in the map from the memory 15 and transmits all the found URLs to the navigation device 1. This method is effective in particular when a map shown on the display screen concerns a relatively small area with the limited number of home pages established in the area.

The base station 14 can be commonly used by a plurality of vehicles that are each provided with the navigation device according to the present invention. The base station may be installed at multiple places, one in each of specified areas so that each vehicle with the navigation device can communicate with a base station existing in the area where the vehicle is traveling. It is also possible for the vehicle to communicate with one of base stations that provide different specific home-page URLs.

The navigation device according to the present invention may also have a memory in which a data table containing records of URLs of home pages corresponding to respective objects to be shown on a map. The device can obtain by itself any required home-page URL when the user designates an object existing on the current map shown on the display screen.

The present invention is not restricted to the above-described aspects of navigation systems. For example, the base station may have a home page written in HTML (Hypertext markup language), which home page can be accessed directly by the navigation device via the Internet.

In this case, a position on the map, which is situated at 35° 46'42" North latitude and 139° 37'59" East longitude, is transmitted in terms of:

http://www.honda.service.cp.jp/cgi-bin/kensaku_n=
   035642_e=1393759

At the base station, the item of /n=0354642.e=21393759/ is transferred to the retrieving program kensaku by which a URL of a home page corresponding the object existing in an area situated at 35° 46'42" North latitude and 139° 37'59" East longitude is retrieved and then transmitted to the navigation device 1, such as shown in FIG. 7 for the two latitudes and two longitudes bracketing those precise numbers to seconds at the angles.

At the navigation device, the received home-page URL corresponding to the position data n=0354642 and e=1393759 is presented on the display screen. At the same time, a switch linked to the URL of the home page corresponding to the object in the area defined at 35° 46'42" North latitude and 139° 37'59" East longitude is also shown on the display screen. When the user selects this switch, the desired home page appears on the display screen.

The navigation device according to the present invention is not restricted to the type for use in vehicles and may be of the portable type that the user can easily carry and use.

The portable navigation device works by counting the number of walking steps of the user by a shock sensor, determining a walked distance by multiplying the number of steps by a specified step length and determining the current position on a road map in the direction detected by the direction sensor while calculating the current position on the map based on a measurement by the GPS receiver. Namely, the device may determine the current position by complementarily matching two measurements on the road map. It may, of course, determine the current position on the map by simply using the measurement by the GPS receiver.

As is apparent from the foregoing, the navigation device according to the present invention enables the user to easily obtain guide information on any one of the objects existing on the map shown on the display screen, utilizing the Internet home pages. For example, it is possible for the user to read information on a company, a restaurant, a parking lot or traffic information on a national road on the display screen.

It is also possible to always obtain updated information on objects shown on the map from respective home pages established for the objects. The scope of available guide information on respective objects can also be expanded by simply writing URLs of new home pages to the memory 15 of the base station.

What is claimed is:

1. A navigation device for determining a current position of the device and displaying the determined current position on a map shown on a display screen, which device is provided with a wireless internet communication means, a browser means for connection with any one of specified home pages established in the Internet's world-wide web according to a specified URL, and a memory means for storing a data table for registering URLs of the home pages for providing information on respective stationary objects existing on the displayed map, and wherein data of a specified stationary object is obtained from digital map data by designating the specific stationary object on the displayed map shown on the display screen, a URL of a home page corresponding to the object data is read from the memory means and transferred to the browser means by which a content of the home page of the specified stationary object is then obtained and displayed on the display screen.

2. A navigation device for determining a current position of the device and displaying the determined current position on a map shown on a display screen, which device is provided with a wireless Internet communication means, a browser means for connection with any one of specified home pages established in the Internet's world-wide web according to a specified URL, a base station separate from said navigation device, a memory specially used for registering a data table of URLs corresponding to information of respective objects on the displayed map is disposed in said base station from which a URL of a desired home page corresponding to a specified object data is obtained by wireless communication with the base station from the navigation device, and wherein said specified object data is obtained by designating the object on the map shown on the display screen, and then a URL of a home page corresponding to the object data is read from said memory and transferred to the browser means by which a content of the home page is then obtained and displayed on the display screen.

3. A navigation device for determining a current position of the device and displaying the determined current position on a map shown on a display screen, which device is provided with a wireless Internet communication means, a browser means for connection with any one of specified home pages established in the Internet's world-wide web according to a specified URL, and a memory means having memory spaces corresponding to respective map numbers and storing URLs of specified home pages for respective objects existing in a mapped area specified by a map number in a corresponding one of the memory spaces, and wherein a URL of a home page corresponding to data of a designated object is read from the memory means according to the map number shown on the display screen and transferred to the browser means by which a content of the home page is then obtained and displayed on the display screen.

4. A navigation device as defined in claim 3, characterized in that the memory means having memory spaces corresponding to respective map numbers and used specially for storing the URLs of the home pages established for objects existing in respective map areas specified by the map numbers is disposed in a base station separate from the device from which a URL of a desired home page corresponding to a specified object data is obtained by wireless communication with the base station.

5. A navigation device for determining a current position of the device and displaying a determined current position on a map shown on a display screen, which device is provided with a wireless Internet communication means, a browser means for connection with any one of specified home pages established in the Internet's world-wide web according to a specified URL, and a memory means for storing a data table of registered URLs of home pages with reference to respective positions on the map, and wherein according to a designation of a position of an object existing on the map shown on the display screen, a URL of the home page corresponding to the object data is read from the memory means and transferred to the browser means by which a content of the home page is then obtained and displayed on the display screen.

6. A navigation device as defined in claim 5, characterized in that the memory means for storing therein a data table of the registered URLs of the home pages corresponding to respective positions on the map is disposed in a base station separate from the device from which a URL of a desired home page corresponding to the specified object data is obtained by wireless communication with the base station.

7. A navigation device comprising, means for determining a current position of the device, a display screen for displaying a roadmap that includes the current position of the device, means for indicating on the displayed roadmap the determined current position of the device, a wireless Internet communication means, a browser means for connection with any one of specified home pages established in the Internet's world-wide web according to a specified URL, a memory means for storing data corresponding to respective road maps for display and for storing URLs of specified home pages for respective stationary objects existing on each said road map, means for selecting at least one said stationary object on the displayed road map for causing the URL of a home page of each said selected stationary object to be read from the memory means according to the displayed roadmap and for displaying each said URL on the display screen, and means for selecting a URL displayed on the display screen and causing said browser means, through said wireless Internet communication means, to obtain the content of the home page of the selected URL and to display the home page on the display screen.

8. A navigation device as defined in claim 7, characterized in that the memory means is disposed in a base station separate from the device and each said URL corresponding to a specified object data is obtained therefrom by a separate wireless communication with the base station from the navigation device.

* * * * *